Figure 1:
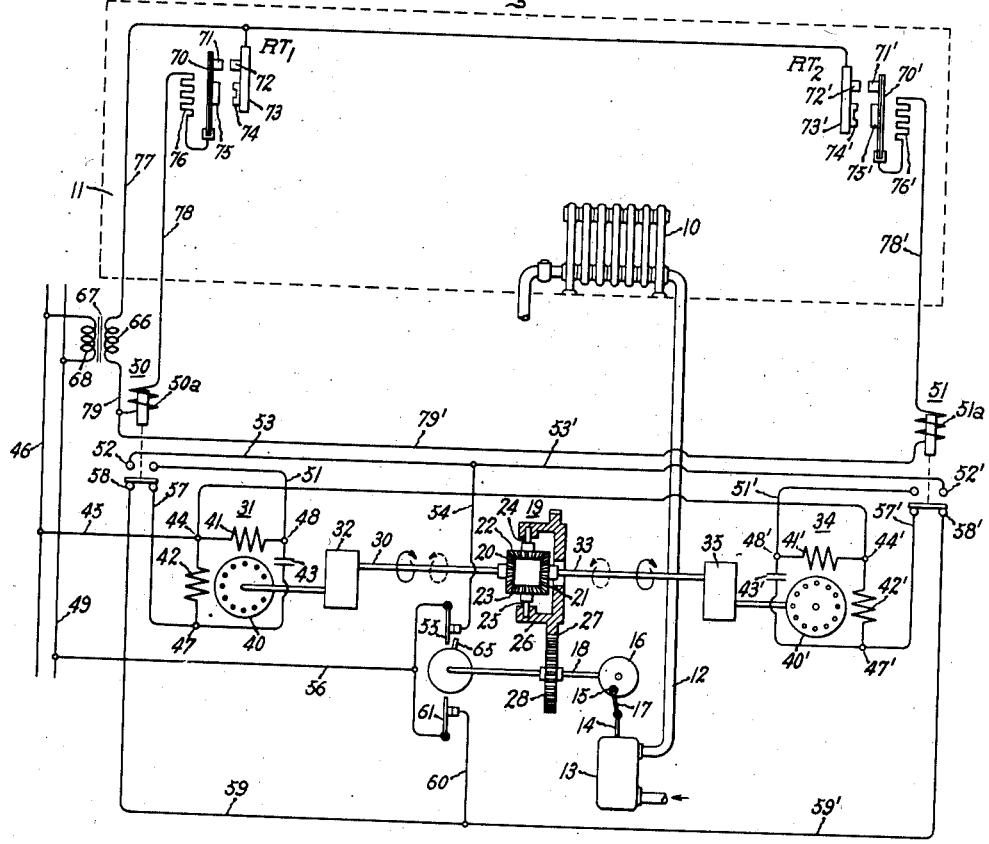

Aug. 4, 1942.　　　　　E. W. ROESSLER　　　　　2,292,160
TEMPERATURE CONTROL SYSTEM
Filed April 16, 1941　　　　　2 Sheets-Sheet 1

Inventor:
Edward W. Roessler,
by Harry E. Dunham
His Attorney.

Aug. 4, 1942.  E. W. ROESSLER  2,292,160
TEMPERATURE CONTROL SYSTEM
Filed April 16, 1941   2 Sheets-Sheet 2

Inventor:
Edward W. Roessler,
by Harry E. Dunham
His Attorney.

Patented Aug. 4, 1942

2,292,160

UNITED STATES PATENT OFFICE 2,292,160

TEMPERATURE CONTROL SYSTEM

Edward W. Roessler, Caldwell, N. J., assignor to General Electric Company, a corporation of New York Application April 16, 1941, Serial No. 388,849

5 Claims. (Cl. 236—1)

My invention relates to control systems and more particularly to temperature control systems.

The problem of thermostatically controlling conditioning apparatus to maintain a uniform temperature in an enclosure such as a building or a portion thereof is complicated by the fact that a temperature differential exists between different zones in the conditioned space that varies with outside temperature conditions. For example, a variable temperature differential may exist between the breathing line level and the floor level due to air stratification or a variable temperature differential may exist between zones adjacent inside and outside walls due to exposure conditions. Hence, it is very difficult to locate a single thermostat in a conditioned space where it will be responsive to an average temperature condition in the space. Thus, with conditioning systems utilizing one control thermostat, even though the temperature in a zone adjacent the thermostat is maintained substantially constant, the temperature in other zones of the conditioned space may vary sufficiently with different outside temperature conditions to cause discomfort to the occupants.

It is an object of my invention to provide an improved temperature control system that will maintain more nearly constant an average temperature condition of a conditioned space.

More particularly, it is an object of my invention to provide conditioning apparatus controlled jointly by two or more condition responsive devices, located in different zones of a conditioned space or spaces, in such a manner that an average of the condition in the two or more zones will be maintained constant.

Further objects and advantages of my invention will become apparent as the following description proceeds, and the features of novelty which characterize my invention will be pointed out with particularity in the claims annexed to and forming a part of this specification.

Briefly, according to my invention conditioning apparatus, such as for example, building heating apparatus, is controlled by a regulating device governing, according to its position, the output of the heating apparatus. The regulating device is actuated by a differential gear mechanism connected to two or more reversible motors in such a manner that the movement imparted to the regulating device is a function of the algebraic sum of the rotative movements of the motors. The direction of rotation of each motor is periodically reversed by separate timing devices, the timing actions of which are varied in accordance with the temperature conditions in two or more zones of the conditioned space that are selected for control purposes. The action of the control system is such that when the average of the temperature conditions in the zones is at a predetermined value the effective position of the regulating device remains constant. However, upon a deviation of the average temperature condition from the predetermined value the regulating device is moved in a direction to return the average temperature to the predetermined value.

Figure 2:
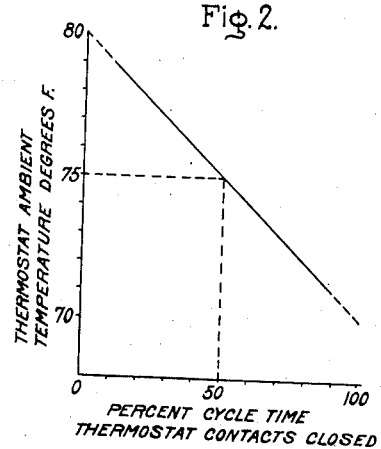
Figure 3:
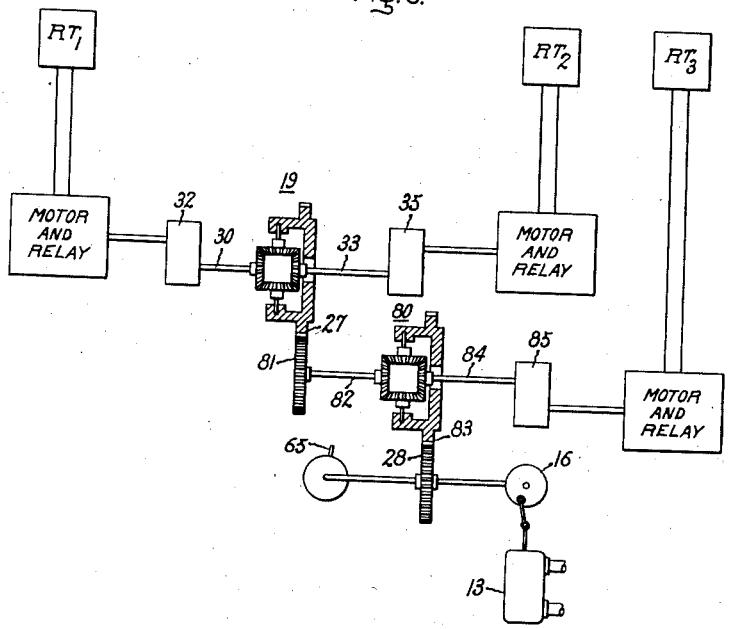
Figure 4:
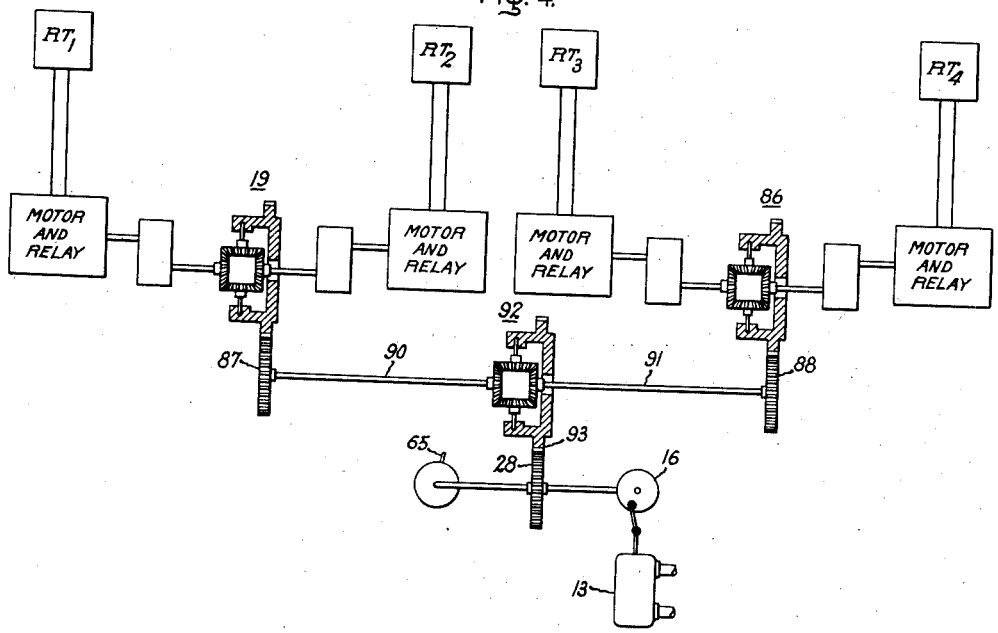

My invention will be better understood from the following description taken in connection with the accompanying drawing in which Fig. 1 illustrates in diagrammatic form a temperature control system embodying my invention; Fig. 2 is a graphical representation of a thermostat operating characteristic; Fig. 3 is a modification utilizing three control thermostats, and Fig. 4 is a modification utilizing four control thermostats.

Referring to Fig. 1 of the drawings, I have shown temperature changing apparatus comprising a radiator 10 for supplying heat to a space 11, the temperature of which is to be controlled. The radiator, which, for example, may be of the steam or hot water type, is supplied with heating fluid through a main or conduit 12 connected to a suitable source of heating fluid not shown.

A valve 13 located in the conduit 12 acts as a regulating device governing according to its position the heat output of radiator 10. The valve 13 has an operating member 14 connected to a pin 15 projecting from a crank disk 16 by means of a pitman 17. The crank disk 16 is driven by a shaft 18 so that a rotative movement of the shaft 18 in one direction or the other acts to open or close the valve 13. The shaft 18 is driven through a differential coupling indicated generally at 19, which, for the purpose of illustration, is shown as comprising mechanical differential gearing including two driving bevel gears 20 and 21 and a pair of intermediate bevel gears 22 and 23. The intermediate gears 22 and 23 have shafts 24 and 25 supported by a cylindrical shell or cap 26 which is rotatably mounted and has integrally formed therewith a gear 27. The gear 27 is arranged to drive a spur gear 28 mounted on and secured to the shaft 18. The driving gear 20 is secured to a rotary member or shaft 30 which is driven by a reversible motor 31 through suitable reduction gearing 32. Similarly the driving gear 21 is secured to a rotary member or shaft 33 which is driven by a second reversible motor 34 through a suitable reduction gearing 35. Due to the inherent functioning of the differential gear mechanism 19 the rotational movement of the planetary gear 27 and consequently the movement of the valve operator 14 is a function of the algebraic sum of the rotative movements of the motors 31 and 34. The gear reductions 32 and 35 are designed so that when the reversible motors 31 and 34 rotate equal amounts in opposite directions the valve 14 will remain stationary.

The reversible motors 31 and 34 are identical in construction and may be, as illustrated, the condenser induction type. For convenience similar parts and circuit connections for motors 31 and 34 have been given like reference numerals except those referring to motor 34 have been primed. Each motor has an armature 40 and a pair of field windings 41 and 42. The field windings 41 and 42 are connected together at one end thereof and between the opposite ends of the winding is connected a condenser 43. The junction 44 of the field windings 41 and 42 is permanently connected to a power supply conductor 46 by means of a conductor 45. By selectively connecting the other motor terminals 47 and 48 to the other supply conductor 49 the motor can be made to rotate in either direction in a well known manner.

A pair of two position control devices or relays 50 and 51 are provided for controlling respectively the directions of rotation of the reversible motors 31 and 34. The motor terminal 48 of the motor 31 is connected to the power supply conductor 49 by a circuit including the conductor 51, a pair of normally open contacts 52 of the relay 50, conductors 53 and 54, a limit switch 55 and conductor 56. The motor terminal 47 is connected to the power supply conductor by a circuit including the conductor 57, a pair of normally closed contacts 58 of the relay 50, conductors 59 and 60, a limit switch 61 and conductor 56. Thus, when the relay 50 is in the deenergized position, as shown, a circuit is completed through the normally closed contacts 58 causing the motor to rotate in one direction and when the relay 50 is energized a circuit is completed through the normally open contacts 52 to cause rotation of the motor 31 in the opposite direction. The motor terminals 47' and 48' of the reversible motor 34 are similarly connected to the normally closed contacts 58' and the normally open contacts 52' of the relay 51 so that the direction of rotation of the motor 34 depends upon whether or not the relay 51 is energized or deenergized. The arrangement is such that when both relays 50 and 51 are deenergized the motors 31 and 34 will rotate in the same direction causing the shafts 30 and 33 to rotate in the direction indicated by the solid arrows. Due to the arrangement of the differential coupling 19 this movement will cause the valve operator 14 to move in a position to close the valve. Similarly, when both relays 50 and 51 are energized the motors 31 and 34 will rotate in the opposite directions causing a rotative movement of the shafts 30 and 33 in a direction indicated by the dotted arrows resulting in a movement of the valve operator 14 in a direction to open the valve 13. When one of the relays 50 and 51 is energized and the other is deenergized the motors 31 and 34 and the shafts 30 and 33 will rotate in opposite directions and the valve operator will remain stationary.

The limit switches 55 and 61 are actuated by a cam 65 mounted on the shaft 18 and are provided for preventing overtravel of the valve 13 beyond the completely open or completely closed positions.

The operating coils 50a and 51a of the relays 50 and 51 are energized from a suitable source of electricity which may, for example, be the secondary winding 66 of a suitable step down transformer 67 having its primary winding 68 connected to the power supply conductors 46 and 49. The energizing circuit of the operating coil 50a includes the contacts of a room thermostat $RT_1$ and the energizing circuit of the holding coil 51a includes the contacts of a second room thermostat $RT_2$ so that the relays 50 and 51 are controlled respectively by the thermostats $RT_1$ and $RT_2$.

The room thermostat $RT_1$ is shown as comprising a bimetallic temperature responsive element 70, fixed at one end and carrying at its free end a movable contact 71. The contact 71 cooperates with a stationary contact 72 mounted on a fixed support 73. Also attached to the support 73 is a permanent magnet 74, which, in cooperating with an armature 75 attached to the bimetal element 70, acts to give the thermostat a temperature differential of operation in a manner well known in the art.

In order to cause the thermostat contacts to continuously move between the open and closed positions and thereby function as a temperature responsive timing means, an auxiliary heater 76 is provided which is connected to be energized when the thermostat contacts are closed and deenergized when the contacts are open. The energizing circuit for the heater 76 may be traced as follows: the secondary winding 66 of the transformer 67, the conductor 77, the thermostat contacts 71 and 72, the bimetallic member 70, the heater 76, the conductor 78, the operating coil 50a of relay 50, and conductor 79 back to the secondary winding 66. Thus it will be apparent that when the thermostat contacts 71 and 72 close, the heater 76 and the relay 50 will be energized. When the heater 76 has heated the bimetal 70 to the opening temperature the contacts 71 and 72 snap open due to a flexing of the bimetal 55 and the heater 76 and the relay 50 are deenergized. Due to the heating action of the electric heater 76 the thermostat contacts continuously open and close causing energization and deenergization of the relay 50 at spaced time intervals which vary in accordance with the temperatures at the location of the room thermostat $RT_1$. This action will be described in greater detail below.

The construction of the room thermostat $RT_2$ is exactly the same as that of $RT_1$ and corresponding parts and circuit connections have been given like reference numerals except that they have been primed. The room thermostat $RT_2$ causes energization and deenergization of the relay 51 at spaced time intervals which vary in accordance with the temperature at the location of the room thermostat $RT_2$.

The room thermostats $RT_1$ and $RT_2$ may be located at selected control points in different temperature zones in the space 11 and preferably these control points are selected in zones where maximum temperature differences exist. For example, $RT_1$ may be located adjacent an inside wall and $RT_2$ adjacent an outside wall in cases where there is a high horizontal temperature gradient due to an outside exposure. In cases where there is a high vertical temperature gradient due to air stratification $RT_1$ may be located at the floor level and $RT_2$ at the breathing line level. The specific location of RT₁ and RT₂ will of course vary with different installations, the selected location depending upon what temperature conditions are desired to be used for the purposes of obtaining an average control.

For best operation of the system each thermostat should be adjusted so that its contacts remain closed fifty per cent of the thermostat cycle time at the desired average temperature to be maintained, which for the purpose of illustration will be assumed to be 75 degrees F. in the following discussion. The adjustment of each thermostat may be varied by changing the opening and closing temperatures of the thermostat contacts and by varying the maximum heating effect of the auxiliary heater 76. However, to secure proper timing action, the maximum heating effect of the heater 76 must always be greater than the temperature differential of operation of the thermostat, i. e., the difference between the temperatures at which the thermostat contacts open and close.

In Fig. 2 of the drawings the curve shows the relationship between the per cent cycle time the thermostat contacts remain closed and the thermostat ambient temperature for the case which will be assumed for illustration where the maximum heating effect of the heater 76 is 10 degrees F. and the thermostat opening and closing temperatures are 81 and 79 degrees F. respectively. By the maximum heating effect of the auxiliary heater 76 is meant the number of degrees of temperature it can raise the thermostat temperature responsive element above ambient temperature if it is continuously energized. It will be noted by reference to Fig. 2 that contacts remain closed fifty per cent of the cycle time when the thermostat ambient temperature is 75 degrees F., which is the assumed average value to be maintained. It will be understood that the specific temperature values used in this description of my invention are for the purpose of illustration only and other temperature values may be selected as desired.

In operation, the room thermostats RT₁ and RT₂ control respectively the direction of oscillating movement of the motors 31 and 34 whose relative rotative movements are integrated by the action of the differential coupling 19 which in turn controls the position of the valve operator 14 and consequently the heat output of the radiator 10. The inherent timing action of each thermostat is such that the speed and direction of oscillating movement of its associated motor and drive shaft is a function of the deviation of the thermostat ambient temperature from a predetermined value. Thus when the average of the ambient temperatures at RT₁ and RT₂ is at a predetermined value the average heat output of the radiator 10 remains constant and equilibrium condition obtains. Upon any deviation of this average value from the predetermined value the heat output of the radiator 10 is automatically changed in a proper direction until the deviation is reduced to zero and a new equilibrium condition is obtained at a new radiator heat output.

It is believed that the operation of my improved temperature control system may be best explained by taking a concrete example for the purpose of illustration. Let it be assumed that the room thermostats RT₁ and RT₂ are adjusted so that the curve shown in Fig. 2 is applicable and that the average temperature to be maintained, that is, the average of the temperatures at RT₁ and RT₂ is 75 degrees F. Also let it be assumed that the temperatures at RT₁ and RT₂ are both 75 degrees F. and therefore the contacts of both thermostats will be open fifty per cent of the cycle time and closed fifty per cent of the cycle time, as indicated by the curve shown in Fig. 2. The relays 50 and 51 will then be energized and deenergized equal periods of time causing the motors 31 and 34 to rotate equal periods in opposite directions. The relative rotation of the shafts 30 and 33 in opposite directions will then be equal so that the effective position of the planetary gear 27 and the valve 13 will remain unchanged. This is the desired condition since the average temperature is 75 degrees F. which is the value to be maintained.

Suppose now that the temperature at RT₁ is 76 degrees F. and the temperature at RT₂ is 74 degrees F. so that the average value is still 75 degrees F. Referring to the curve shown in Fig. 2, it will be noted that the contacts of RT₁ will remain closed forty per cent of the thermostat cycle time while the contacts of RT₂ will be closed sixty per cent of the thermostat cycle time. As a result the shaft 30 will rotate in a direction indicated by the solid arrow for sixty per cent of the thermostat cycle time and in the opposite direction for forty per cent of the thermostat cycle time, whereby the net movement of the shaft 30 is in the direction of the solid arrow. On the other hand, the shaft 33 will rotate in the direction of the solid arrow forty per cent of the thermostat cycle time and in the opposite direction for sixty per cent of the thermostat cycle time with the result that the net rotative movement of the shaft 33 is in the direction of the dotted arrow and is equal to the net movement of shaft 30. Therefore, since the net movements of the shafts 30 and 33 are equal and in opposite directions the net movements of the planetary gear 27 and the valve operating member 14 are again zero which is the desired condition since the average temperature is still 75 degrees F.

If the temperatures assumed above for RT₁ and RT₂ are just reversed the net movements of the shafts 30 and 33 will be just the reverse and it is obvious that the effective position of the valve operating member 14 will still remain unchanged. It is believed that the above cited examples are sufficient to show that so long as the average of the temperatures at RT₁ and RT₂ are 75 degrees F. the effective position of the valve will remain unchanged and therefore an equilibrium condition will occur, the output of the radiator 10 remaining constant.

Now let it be assumed that for some reason, such as a drop in outside temperature, the temperature at RT₁ changes to 75 degrees F. and the temperature at RT₂ changes to 73 degrees F. so the average temperature is 74 degrees F. which is below the average of 75 to be maintained. For this condition reference to Fig. 2 shows that the contacts of RT₁ will be closed fifty per cent of the cycle time and the contacts of RT₂ will be closed seventy per cent of the cycle time. As a result the shaft 30 will rotate equal distances in opposite directions so that its net movement is zero. The shaft 33 however will move in a direction indicated by the dotted arrow seventy per cent of the thermostat cycle time and will move in the opposite direction only thirty per cent of the thermostat cycle time with the result that the net movement of the shaft 33 is in the direction of the dotted arrow. This will cause the planetary gear 27 to rotate in a direction to move the valve operator 14 towards the more open position admitting more heating fluid to the radiator 10 and increasing its heat output. This action will continue until the increased heat output of the radiator 10 causes the temperature of the space 11 to rise to a point where the average of the temperatures at $RT_1$ and $RT_2$ is again 75 degrees F. at which point the effective position of the valve operator 14 will remain constant, as explained above, and a new equilibrium condition will obtain.

Again let it be assumed that, due to a rise in outside temperature, the temperature at $RT_1$ changes to 77 degrees F. and the temperature at $RT_2$ changes to 75 degrees F. so that the average is 76 which is above the value of 75 degrees F. to be maintained. Under this condition reference to Fig. 2 will show that the contacts of $RT_1$ will be closed thirty per cent of the cycle time while the contacts of $RT_2$ will be closed fifty per cent of the cycle time. As a result the shaft 30 will move in the direction of the solid arrow seventy per cent of the cycle time and in the direction of the dotted arrow thirty per cent of the cycle time with the result that the net movement of the shaft 30 is in the direction of the solid arrow. The shaft 33, however, will move equal distances in opposite directions so that its net movement is zero. As a result the net movement of the planetary gear 27 is in a direction to move the valve operator 14 towards the closed position thereby decreasing the heat output of the radiator 10. As a result of the decreased heat output of the radiator 10 the temperature of the space 11 will fall until the average of the temperatures at $RT_1$ and $RT_2$ is again 75 degrees F. under which condition the position of the valve operator 14 will again remain constant and a new equilibrium condition will obtain.

It is now believed to be apparent from the foregoing that my improved temperature control system is responsive to temperature conditions at the location of $RT_1$ and $RT_2$ and functions automatically to maintain their average value constant under varying conditions. Since my temperature control system is responsive to two temperature conditions of the conditioned space it is obvious that the average control that is obtained functions to maintain the average temperature condition in a conditioned space which is much more nearly constant than would otherwise be obtainable with the use of a single thermostat.

The thermostats $RT_1$ and $RT_2$ may be located so as to be responsive to temperature conditions in entirely separate enclosures in systems where the operation of the temperature changing apparatus under the control of a single regulating device functions to change the temperature in both enclosures. In such a case the average of the temperature conditions in each enclosure would be maintained constant.

My invention is not limited to the use of two control thermostats as any number of control thermostats may be used by the addition of suitable integrating mechanism. For example, I have shown diagrammatically in Fig. 3 of the drawings a modified arrangement utilizing three control thermostats $RT_1$, $RT_2$ and $RT_3$ which may be located in different zones. Here the control thermostats $RT_1$ and $RT_2$, the associated reversible motors and relays, the gear reductions and the differential are the same as described in connection with Fig. 1. The planetary gear 27 of the differential 19, however, instead of being connected directly to gear 28 on the operating shaft of valve 13 is connected to an input bevel gear of a second differential gear mechanism 80 by means of a gear 81 and a shaft 82. The planetary gear 83 of the differential 80 is arranged to drive the valve operating gear 28. The other input bevel gear of the differential 80 is connected by means of a shaft 84 and a gear reduction 85 to a reversible motor controlled by the room thermostat $RT_3$. The room thermostat $RT_3$ and its associated motor and relay are the same as described in connection with $RT_1$ and $RT_2$. It will be obvious in view of the foregoing description in connection with Fig. 1 that this arrangement will operate to maintain constant the average of the temperatures at the locations of the thermostats $RT_1$, $RT_2$ and $RT_3$ by integrating the movements of the thermostatically controlled motors. If the gear reduction 85 is such that the speed of the shaft 84 is equal to one half the speed of the shafts 30 and 33, each thermostat will exert an equal influence on the operation of valve 13.

As a further example I have shown in Fig. 4 of the drawings an arrangement utilizing four control thermostats $RT_1$, $RT_2$, $RT_3$ and $RT_4$. In this arrangement $RT_3$ and $RT_4$ control a differential gear mechanism 86 in the same manner that $RT_1$ and $RT_2$ control the differential gear mechanism 19. The two differentials 19 and 86 are coupled by means of gears 87 and 88 and shafts 90 and 91 to the input bevel gears of a third differential 92 having a planetary gear 93 coupled to the operating gear 28 of valve 13. It will be evident from the foregoing that this arrangement will operate to control valve 13 so that the average of the temperatures at the locations of all four thermostats will be maintained constant the movements of all the thermostatically controlled motors being integrated.

It will be obvious from a study of the above described embodiments of my invention that any number of thermostatically controlled reversible motors may be combined to obtain an averaged control by the use of suitable integrating mechanism. Furthermore, by changing the relative speeds of the input drive shafts of the differential gear mechanism or mechanisms, the influence of any control thermostat or group of thermostats may be varied with respect to any other thermostat or group of thermostats in the system. This may be conveniently done by changing the relative ratios of the gear reductions between the reversible motor and the differential gear mechanism.

It will be understood that while I have illustrated my improved temperature control apparatus in an arrangement for controlling the position of a modulating valve, it may be used to control the movement of any regulating device which modulates according to its position the output of the temperature changing apparatus without departing from my invention in its broader aspects. It will also be understood that my control system is applicable equally well to cooling as well as heating systems.

While I have shown and described particular embodiments of my invention it will be apparent to those skilled in the art that my invention has other applications and that changes and modifications may be made without departing from the spirit and scope of my invention. I, therefore, aim in the appended claims to cover all such modifications and changes.

What I claim as new and desire to secure by Letters Patent of the United States is:

1. In a control system for maintaining constant the average of the temperature conditions of two zones, apparatus for changing the temperature of said zones, a regulating device governing according to its position the effect of said temperature changing apparatus, a first motor, a first two position control device for controlling the direction of movement of said motor, means for moving said first control device alternately from one position to the other at spaced time intervals variable in accordance with the temperature condition of one of said zones, a second motor, a second two position control device for controlling the direction of movement of said second motor, means for moving said second control device alternately from one position to the other at spaced time intervals variable in accordance with the temperature condition of the other of said zones, and differential mechanism connected to said motors for positioning said regulating device.

2. In a control system for maintaining constant the average of temperature conditions of two zones, apparatus for changing the temperature of said zones, a regulating device governing according to its position the effect of said temperature changing apparatus, a reversible motor, timing means operable to reverse periodically the direction of rotation of said motor and responding to the deviations in the temperature condition of one of said zones from a predetermined value to vary the relative rotative movement of said motor in opposite directions, a second reversible motor, a second timing means operable to periodically reverse the direction of rotation of said second motor and responding to the deviations in the temperature condition of the other of said zones from said predetermined value to vary the relative rotative movements of said second motor in opposite directions, and differential mechanism connected to said motors for positioning said regulating device.

3. In a system for controlling temperature changing apparatus in accordance with the variations of two temperature conditions, a reversible motor, means for periodically reversing the direction of rotation of said motor, said means responding to one of said temperature conditions to vary the relative rotative movements of said motor in opposite directions, a second reversible motor, means for periodically reversing the direction of rotation of said second motor, said second means responding to the other of said temperature conditions to vary the relative rotative movements of said second motor in opposite directions, differential mechanism connected to said motors, said mechanism having a member whose movement is a function of the algebraic sum of the rotative movement of said motors, and means actuated by the movement of said member for controlling said temperature changing apparatus.

4. In a control system for maintaining constant the average of the temperature conditions in a plurality of zones, apparatus for changing the temperature of said zones, a temperature responsive timing device associated with each of said zones and responsive to its temperature condition, a reversible motor associated with each timing device and arranged to be controlled thereby, each timing device acting to reverse periodically the direction of rotation of its associated motor at time intervals variable in accordance with the temperature condition of the zone with which the timing device is associated, means for producing a resultant movement which is the algebraic sum of the rotative movements of each motor, and means for controlling said temperature changing apparatus in accordance with said resultant movement.

5. In a system for controlling the average temperature of a plurality of zones, apparatus for changing the temperature of said zones, means responsive to the temperature in each zone, a rotary member associated with each zone, means controlled by said temperature responsive means for causing each rotary member to progress by rotary movement upon the occurrence of a deviation in the temperature in its associated zone from a predetermined value, the progression being in a direction determined by the direction of said deviation and at a speed variable in accordance with the amount of said deviation, means for varying the output of said apparatus, and means for actuating said output varying means in accordance with the algebraic sum of the movements of said rotary members.

EDWARD W. ROESSLER.